(12) United States Patent
Kotaro et al.

(10) Patent No.: US 8,927,453 B2
(45) Date of Patent: Jan. 6, 2015

(54) MOLYBDENUM AND TUNGSTEN NANOSTRUCTURES AND METHODS FOR MAKING AND USING SAME

(71) Applicant: Brookhaven Science Associates, LLC, Upton, NY (US)

(72) Inventors: Sasaki Kotaro, Hauppauge, NY (US); Wei-Fu Chen, Ridge, NY (US); James T. Muckerman, Port Jefferson, NY (US); Radoslav R. Adzic, East Setauket, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 37 days.

(21) Appl. No.: 13/868,030

(22) Filed: Apr. 22, 2013

(65) Prior Publication Data

US 2013/0281285 A1    Oct. 24, 2013

Related U.S. Application Data

(60) Provisional application No. 61/636,169, filed on Apr. 20, 2012.

(51) Int. Cl.
| | |
|---|---|
| *H01M 4/86* | (2006.01) |
| *C25B 11/04* | (2006.01) |
| *C25B 11/12* | (2006.01) |
| *C25B 1/04* | (2006.01) |
| *B82Y 40/00* | (2011.01) |
| *B82Y 30/00* | (2011.01) |

(52) U.S. Cl.
CPC ......... *H01M 4/8652* (2013.01); *C25B 11/0478* (2013.01); *C25B 11/12* (2013.01); *C25B 1/04* (2013.01); *Y10S 977/755* (2013.01); *Y10S 977/896* (2013.01); *B82Y 40/00* (2013.01); *B82Y 30/00* (2013.01); *Y02E 60/366* (2013.01)
USPC ........... 502/177; 423/351; 423/414; 502/182; 502/185; 502/200; 977/755; 977/896; 977/755

(58) Field of Classification Search
None
See application file for complete search history.

(56) References Cited

U.S. PATENT DOCUMENTS

| | | |
|---|---|---|
| 7,960,594 B2 | 6/2011 | Zhang et al. |
| 2009/0000956 A1 | 1/2009 | Weidner et al. |
| 2010/0210454 A1 | 8/2010 | Epshteyn |
| 2012/0037541 A1 | 2/2012 | Li et al. |
| 2013/0178360 A1* | 7/2013 | Lewis et al. ............ 502/315 |

FOREIGN PATENT DOCUMENTS

| | | |
|---|---|---|
| JP | 2001/239163 A | 9/2001 |
| WO | 2011/085731 A1 | 7/2011 |

\* cited by examiner

*Primary Examiner* — Melvin C Mayes
*Assistant Examiner* — Douglas Call
(74) *Attorney, Agent, or Firm* — Dorene M. Price; Christine L. Brakel

(57) ABSTRACT

The present invention provides molybdenum and tungsten nanostructures, for example, nanosheets and nanoparticles, and methods of making and using same, including using such nanostructures as catlysts for hydrogen evolution reactions.

11 Claims, 5 Drawing Sheets

MOLYBDENUM AND TUNGSTEN NANOSTRUCTURES AND METHODS FOR MAKING AND USING SAME

CROSS-REFERENCE TO RELATED APPLICATION

This application claims the benefit of U.S. Provisional Application No. 61/636,169, filed Apr. 20, 2012, which is incorporated herein by reference in its entirety.

This invention was made with Government support under contract number DE-AC02-98CH10886, awarded by the U.S. Department of Energy. The Government has certain rights in the invention.

BACKGROUND OF THE INVENTION

Hydrogen production through the splitting of water has attracted great scientific interest due to its relevance to renewable energy storage and its potential for creating an energy carrier free of carbon dioxide emissions. Electrocatalytic systems for $H_2$ generation typically incorporate noble metals such as platinum (Pt) in the catalysts because of their low overpotential and fast kinetics for driving the hydrogen evolution reaction (HER). However, the high cost and limited world-wide supply of these noble metals makes their use an obstacle to a viable commercial process. Several non-noble metal materials, such as transition metal chalcogenides, carbides and complexes, as well as metal alloys have been widely investigated recently, and characterized as catalysts and supports for application in hydrogen evolution.

Early transition metal nitrides have been demonstrated to have excellent catalytic activities in a variety of reactions. One of the primary interests in the applications of nitrides in these reactions was to use them in conjunction with cheaper alternative metals to replace group VIII noble metals. For example, the function of molybdenum nitride as a catalyst for hydrocarbon hydrogenolysis resembles that of platinum. The catalytic and electronic properties of transition metal nitrides are governed by their bulk and surface structure and stoichiometry. While there is some information concerning the effect of bulk composition on the catalytic properties of this material, there is currently very little known about the effects of surface nanostructure.

Ni and NiMo are known electrocatalysts for hydrogen production in alkaline electrolytes, and in the bulk form have exhibited exchange current densities between $10^{-6}$ and $10^{-4}$ A cm$^{-2}$, compared to $10^{-3}$ A cm$^{-2}$ for Pt (Huot, et al., (1991) J. Electrochem. Soc. 138:1316-1321). Jakšić et al. ((1998) Int. J. Hydrogen Energy 23:667-681) and Jakšić, M. M. ((2001) J. Hydrogen Energy 26:559-578) postulated the hypo-hyper-d-electronic interactive effect between Ni and Mo yields the synergism for the HER. Owing to their poor corrosion stability, few studies in acidic media have been reported.

Owing to these and other disadvantages in the current state of the art, a more affordable and efficient method for hydrogen production is needed.

SUMMARY OF THE INVENTION

With the objective of exploiting the decrease in overpotential by carrying out the HER in acidic media, cheaper, stable and active non-noble metal-based electrocatalysts for the HER have been developed.

Guided by the 'volcano plot' (Trasatti (1972) J. Electroanal. Chem. 39:163-184) in which the activity for hydrogen evolution as a function of the M-H bond strength exhibits an ascending branch followed by a descending branch, peaking at Pt, it is proposed that combining or alloying a metal that binds hydrogen weakly with a metal that binds it strongly, a functional but relatively inexpensive HER catalyst could be developed. In order to achieve optimal efficacy of such HER catalysts, a way in which to increase their resistance to acid corrosion was also desirable. Based upon this hypothesis, an alloyed material was designed on the molecular scale combining transition metals that bind H weakly with metals that bind H strongly and acid resistant nanosheets were produced by nitriding the alloyed metals on carbon supports.

Non-noble metal-molybdenum nitrides ($M_aMo_bN_x$) and non-noble metal-tungsten nitrides ($M_aW_bN_x$) are predicted to have electronic and structural features that result in relatively active catalysts for the HER, even in acidic conditions. The abundant non-noble metals (M) may include Ni, Co, Fe, Cu in addition to other metals including Ga, Ge, Mn, Cr, V, Ti, Zr, Sc, and Y and the rarer metals, Nb, Hf, Ta, La and Ce, as well.

Carbides of similar composition are contemplated as embodiments of the invention.

Supports other than carbon, activated carbon and carbon black that are embodiments include reduced graphene oxides and carbon nanotubes, and nanohorns.

The nanosheets may be supported on carbon, including carbon in the form of activated carbon, carbon black, carbon nanotubes, carbon nanohorns, graphene and reduced graphene oxides, particularly for use as catalysts.

Specifically herein, as a model, NiMo nitride nanosheets on a carbon support (NiMoN$_x$/C) have been synthesized and examined, and the high HER electrocatalytic activity of the resulting NiMoN$_x$/C catalyst with low overpotential and small Tafel slope has been demonstrated.

Heterogeneous electrocatalytic hydrogen evolving systems are created from earth abundant and inexpensive components. With highly exposed reactive sites and a synergism among its components, a NiMoN$_x$/C catalyst exhibited excellent HER activity with the small overpotential of 78 mV, high exchange current density, and a Tafel slope as small as 35 mV dec$^{-1}$.

This is the smallest Tafel slope reported to date for a non-platinum catalyst, suggesting Tafel-like recombination as the rate-limiting step in the catalyzed HER. In acidic media, the NiMoN$_x$ nanosheets can be used without noticeable corrosion. X-ray Absorption Near Edge Structure (XANES), also known as near edge X-ray absorption fine structure (NEXAFS), results provided important insight to the understanding of electronic properties and the stabilizing effect of nitrogen on metallic states of Ni and Mo.

In one aspect, the present invention provides a metal-molybdenum nitride nanosheet comprising $M_aMo_bN_x$, metal-molybdenum carbide nanoparticle comprising $M_aMo_bC_x$, metal-tungsten nitride nanosheet comprising $M_aW_bN_x$, and a metal-tungsten carbide nanoparticle comprising $M_aW_bC_x$, wherein a ranges from 0.05b to 2b, and b is a positive number, and wherein x/(a+b) ranges from 1/10 to 1/0.5. M is selected from the group consisting of Ni, Co, Cu, Fe, Ga, Ge, Mn, Cr, V, Ti, Zr, Sc, Y, Nb, Hf, Ta, La Ce and mixtures thereof, or is selected from the group consisting of Ni, Co, Cu, Fe, Ga, Ge, Mn, Cr, V, Zr, Sc, Y and mixtures thereof, or is selected from the group consisting of Ni, Co, Cu, Fe, and mixtures thereof. Typically, the ratio of a:b is about 1:0.5 to 1:20.

In another aspect, the present invention provides a hydrogen evolution reaction catalyst comprising nano structures selected from the group consisting of metal-molybdenum nitrides, metal-tungsten nitrides, metal-molybdenum carbides, metal-tungsten carbides, and mixtures thereof, wherein the metal is selected from the group consisting of Ni, Co, Fe, Cu, Ga, Ge, Mn, Cr, V, Ti, Zr, Sc, Y, Nb, Hf, Ta, La, Ce and mixtures thereof. Typically, the catalyst is supported by a carbon support. Examples of the carbon support are activated carbon, carbon black, carbon nanotubes, carbon nanohorns, graphene and reduced graphene oxides. Typically, the catalyst has an onset overpotential of less than about 300 mV, or less than about 200 mV, or less than about 100 mV or less than about 80 mV when in the presence of a pH of about 0 to 3.

In another aspect, the present invention provides a method of producing hydrogen. The method comprises: (a) providing a one chamber electrochemical cell comprising: a cathode comprising a hydrogen evolution reaction catalyst, wherein the catalyst comprises nanostructures selected from the group consisting of metal-molybdenum nitrides, metal-tungsten nitrides, metal-molybdenum carbides, metal-tungsten carbides, and mixtures thereof, and (b) applying potential to the electrochemical cell, whereby hydrogen is produced at the cathode. The electrolyte solution in the electrochemical cell has a pH of about 0 to 3. The metal is selected from the group consisting of Ni, Co, Fe, Cu, Ga, Ge, Mn, Cr, V, Ti, Zr, Sc, Y, Nb, Hf, Ta, La, Ce and mixtures thereof.

In another aspect, the present invention provides a method of producing carbon-supported non-noble metal-molybdenum nitride nanosheets. The method comprises heating carbon-supported ammonium molybdate $((NH_4)_6Mo_7O_{24}\cdot 4H_2O)$ and a non-noble metal salt mixture in the presence of $H_2$ at about 200 to 600° C. to produce a reduced product; and reacting the reduced product with $NH_3$ at about 500 to 900° C., thereby making the nanosheets.

In another embodiment, the invention provides a method of producing carbon-supported non-noble metal-molybdenum nitride nanosheets. The method comprises heating carbon-supported ammonium molybdate $((NH_4)_6Mo_7O_{24}\cdot 4H_2O)$ and a non-noble metal salt mixture in the presence of $NH_3$ at about 500 to 900° C., thereby making the nanosheets.

In another embodiments, the invention provides a method of producing carbon-supported non-noble metal-tungsten nitride nanosheets comprising heating carbon-supported ammonium tungstate $((NH_4)_{10}H_2(W_2O_7)_6)$ and a non-noble metal salt mixture in the presence of $H_2$ at about 200 to 600° C. to produce a reduced product; and reacting the reduced product with $NH_3$ at about 500 to 900° C., thereby making the nanosheets.

In another embodiment, the invention provides a method of producing carbon-supported non-noble metal-tungsten nitride nanosheets comprising heating carbon-supported ammonium tungsten tungstate $((NH_4)_{10}H_2(W_2O_7)_6)$ and a non-noble metal salt mixture in the presence of $NH_3$ at about 500 to 900° C., thereby making the nanosheets.

In another embodiment, the invention provides a method of producing carbon-supported non-noble metal-molybdenum carbide nanoparticles comprising heating carbon-supported ammonium molybdate $((NH_4)_6Mo_7O_{24}\cdot 4H_2O)$ and a non-noble metal salt mixture in the presence of an inert gas at about 500 to 1100° C., thereby making the nanoparticles.

In another embodiment, the invention provides a method of producing carbon-supported non-noble metal-tungsten carbide nanoparticles comprising heating carbon-supported ammonium tungstate $((NH_4)_{10}H_2(W_2O_7)_6)$ and a non-noble metal salt mixture in the presence of an inert gas at about 500 to 1100° C., thereby making the nanoparticles.

The salts of the aforementioned methods can be a nitrate, a chloride, a sulfate, a carbonate, a perchlorate, an acetate or mixtures thereof. The non-noble metal of the aforementioned methods can be selected from the group consisting of Ni, Co, Cu, Fe, Ga, Ge, Mn, Cr, V, Ti, Zr, Sc, Y, Nb, Hf, Ta, La, Ce or mixtures thereof.

DETAILED DESCRIPTION OF THE INVENTION

Figure 1:
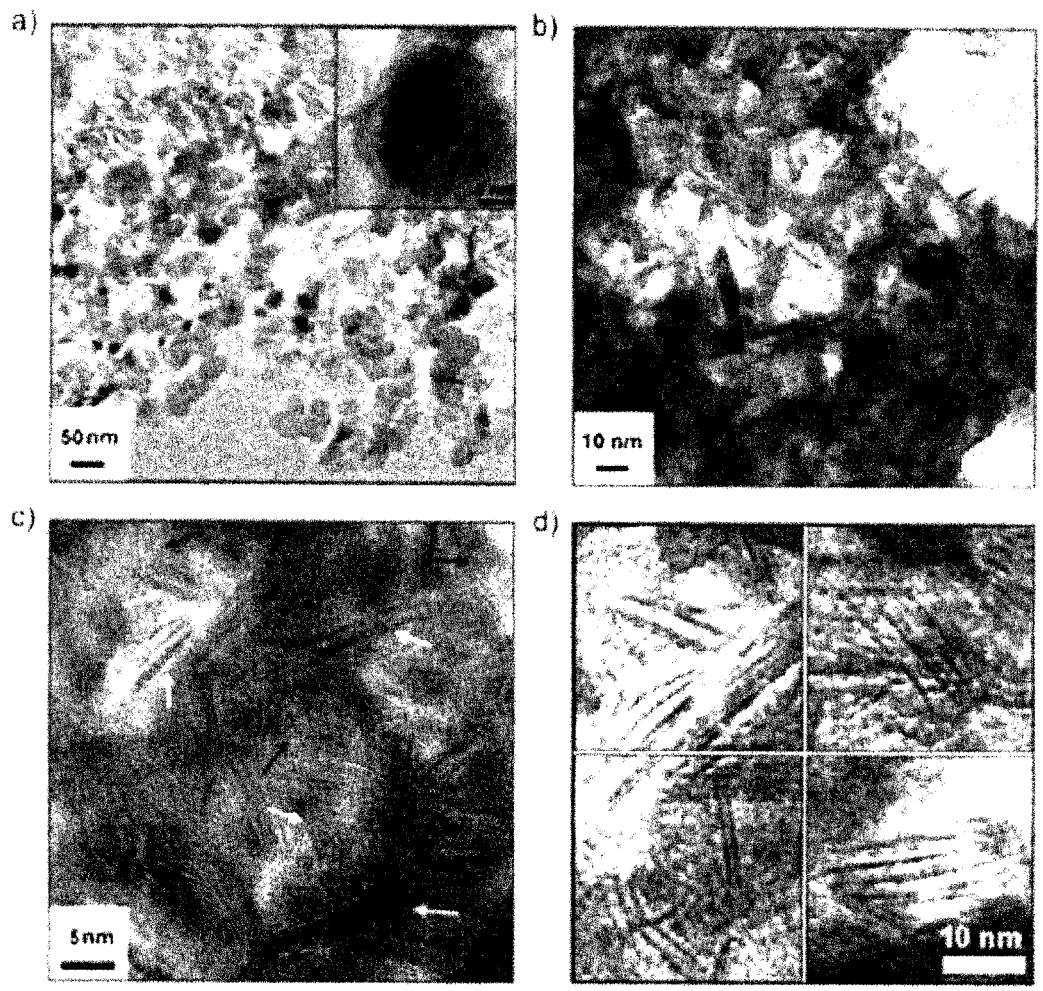
FIG. 1. Transmission electron micrographs (TEMs) of a) C-supported NiMo nanoparticles; b) $NiMoN_x$ nanosheets; c) high resolution TEM (HRTEM) of $NiMoN_x$; d) magnified images of exfoliated $NiMoN_x$ nanosheets.

The present invention relates to molybdenum and tungsten nanostructures, such as, for example, nanosheets and nanoparticles, and methods of making and using same.

Nanostructures

In one aspect, the present invention provides nanosheets. In one embodiment, the nanosheets comprise (or consist essentially of) metal-molybdenum nitride (designated as $M_aMo_bN_x$). In another embodiment, the nanosheets comprise (or consist essentially of) metal-tungsten nitride (designated as $M_aW_bN_x$).

In another aspect, the present invention provides nanoparticles. In one embodiment, the nanoparticles comprise (or consist essentially of) metal-molybdenum carbide (designated as $M_aMo_bC_x$). In another embodiment, the nanoparticles comprise (or consist essentially of) metal-tungsten carbide (designated as $M_aW_bC_x$).

The metals of the nanostructures (designated as "$M_a$") are preferably non-noble metals including, for example, Ni, Co, Fe, Cu, Ga, Ge, Mn, Cr, V, Ti, Zr, Sc, Y, Nb, Hf, Ta, La and Ce. A nanostructure includes only one of these metals or includes any mixture of these metals. Typically, the metals in the nanostructures are selected from the group consisting of Ni, Co, Fe, Cu, Ga, Ge, Mn, Cr, V, Ti, Zr, Sc, Y and mixtures thereof. More typically, the metals in the nanostructures are selected from the group consisting of Ni, Co, Fe, Cu and mixtures thereof.

In the formulae, $M_aMo_bN_x$; $M_aW_bN_x$; $M_aMo_bC_x$; and $M_aW_bC_x$, a typically ranges from about 0.05b to 2b, where b is a positive number, and x/(a+b) typically ranges from about 1/10 to 1/0.5. In the nanostructures, the weight percentage of metals (either (M+Mo) or (M+W)) typically ranges from about 10 to about 40%. Examples of ranges of the ratio of a:b include about 1:0.5 to 1:20, about 1:1 to 1:20, about 1:1 to 1:10, or about 1:1 to 1:5.

The nanostructures are preferably at least 95% free, more preferably at least 99% free, and most preferably virtually completely free of amorphous materials and/or impurities. Examples of amorphous materials include organic surfactants. Examples of impurities include an element different from the recited elements of the nanostructures and a vacancy.

The nanostructures can be in isolated form or can be in a plurality. Examples of pluralities of nanostructures include stacked nanosheets and aggregates of nanoparticles. Typically, stacked nanosheets include from about two to hundreds of stacked nanosheets. Typically, the diameter of an aggregate of nanoparticles is about 0.1 µm to about 10 µm, more typically, about 0.8 µm to about 1.2 µm, and about 0.5 µm to about 1.5 µm. Typically, an isolated nanoparticle is about 1-15 nanometers in diameter.

In one embodiment, the nanostructures are physically supported by a carbon-based support material, i.e., a carbon support. That is, nanosheets and nanoparticles are on the surface of a carbon support. A carbon support is any material that contains carbon. Examples of carbon supports include activated carbon, carbon black, carbon nanotubes, carbon nanohorns, graphene and reduced graphene oxides.

Catalysts and Methods of Using Same

In one aspect of the present invention, catalysts are provided. The catalysts comprise the nanostructures of the present invention, and typically include a carbon support. In particular, the catalysts comprise nanostructures selected from the group consisting of metal-molybdenum nitride nanosheets, metal-tungsten nitride nanosheets, metal-molybdenum carbide nanoparticles, metal-tungsten carbide nanoparticles, and mixtures thereof.

The catalysts are resistant to acid corrosion. Thus, the present invention provides methods by which reactions can be carried out in acidic media, thereby exploiting a low overpotential.

Typically, at a pH of about 0 to 3, the catalysts of the present invention have an onset overpotential of less than about 300 mV, more typically, the catalysts have an onset overpotential of less than about 80 mV or less than about 50 mV.

In one embodiment, the catalysts are used for hydrogen evolution reactions (HER), i.e., for methods of producing hydrogen. The HER takes place on the cathode in an electrochemical cell. For instance, a one-chamber electrochemical cell can comprise a cathode and an anode, (and, optionally, a reference electrode) in an electrolyte. In such cell, the cathode comprises a catalyst of the present invention. For instance, a thin film of the catalyst can be placed on a carbon electrode. Solution in the chamber (e.g., the electrolyte) can be, for example, at a pH of about 0 to 3, 0 to 2, or 1 to 2. Low overpotential of the HER on the catalysts can thus be exploited. Potential is applied to the electrochemical cell, whereby hydrogen is produced at the cathode.

Methods of Making the Nanostructures

In another aspect, methods of making the nanostructures and catalysts of the present invention are provided.

In one embodiment, methods of producing carbon-supported non-noble metal-molybdenum nitride nanosheets and non-noble metal-tungsten nitride nanosheets are provided. The method comprises mixing ammonium molybdate $((NH_4)_6Mo_7O_{24} \cdot 4H_2O)$ or ammonium tungstate $((NH_4)_{10}H_2(W_2O_7)_6)$ with a non-noble metal salt solution, a carbon based material and water to produce an aqueous mixture or slurry. The slurry is dried and then heated in the presence of $H_2$ at about 200 to 600° C. Upon heating, the ammonium molybdate or ammonium tungstate, and the non-noble metal, are reduced, thereby producing a reduced product. The reduced product is then reacted with $NH_3$ at about 500 to 900° C., thereby making nanosheets. The salts of the non-noble metal salt solution can include, for example, a nitrate, a chloride, a sulfate, a carbonate, a perchlorate, an acetate or combinations thereof.

In another embodiment, a further method of producing carbon-supported non-noble metal-molybdenum nitride nanosheets and non-noble metal-tungsten nitride nanosheets are provided. The method comprises mixing ammonium molybdate or ammonium tungstate, a non-noble metal salt solution, a carbon based material and water to form an aqueous mixture. The mixture is heated in the presence of $NH_3$ at about 500 to 900° C., thereby making nanosheets. The salts of the non-noble metal salt solution can include, for example, a nitrate, a chloride, a sulfate, a carbonate, a perchlorate, an acetate or combinations thereof.

In one embodiment, methods of producing carbon-supported non-noble metal-molybdenum carbide nanoparticles and non-noble metal-tungsten carbide nanoparticles are provided. The method comprises mixing ammonium molybdate or ammonium tungstate, a non-noble metal salt solution, a carbon based material and water to form an aqueous mixture. The mixture is dried and then heated in the presence of an inert gas at about 500 to 1100° C., thereby making nanoparticles. Examples of inert gases include Ar or $N_2$. The salts of the non-noble metal salt solution can include, for example, a nitrate, a chloride, a sulfate, a carbonate, a perchlorate, an acetate or combinations thereof.

For instance, carbon-supported non-noble metal molybdenum carbides can be prepared by carburization of a mixture of carbon-supported ammonium molybdate and a non-noble metal salt. An example of a typical procedure is as follows: about 200 mg ammonium molybdate, about 50 mg of nickel nitrate and about 250 mg Vulcan XC-72R carbon black are mixed in water to obtain a loading of about 30 wt % total Mo metal. The slurry is dried at about 130° C. For carburization, the solid mixture is annealed in a tube furnace with about a 100 ml min$^{-1}$ Ar flow from ambient to about 800° C. at a rate of about 15° C. min$^{-1}$ and then held at about 800° C. for about 2 h. Ar is kept purging through the reactor during cooling to ambient temperature.

EXAMPLES

As a model, NiMo nitride nanosheets on a carbon support (NiMoN$_x$/C) were synthesized and examined, and have demonstrated the high HER electrocatalytic activity of the resulting NiMoN$_x$/C catalyst with low overpotential and small Tafel slope.

Heterogeneous electrocatalytic hydrogen evolving systems are created from earth abundant and inexpensive components. With highly exposed reactive sites and a synergism among its components, a NiMoN$_x$/C catalyst exhibited excellent HER activity with the small overpotential of 78 mV, high exchange current density, and a Tafel slope as small as 35 mV/dec.

This is the smallest Tafel slope reported to date for a non-platinum catalyst, suggesting Tafel-like recombination as the rate-limiting step in the catalyzed HER. In acidic media, the NiMoN$_x$ nanosheets can be used without noticeable corrosion. X-ray Absorption Near Edge Structure (XANES), also known as near edge X-ray absorption fine structure (NEXAFS), results provided important insight to the understanding of electronic properties and the stabilizing effect of nitrogen on metallic states of Ni and Mo.

Methods of Making NiMo-Nitride Nanosheets

NiMoN$_x$/C was synthesized by reduction of a carbon-supported ammonium molybdate ((NH$_4$)$_6$Mo$_7$O$_{24}$.4H$_2$O) and nickel nitrate (Ni(NO$_3$)$_2$.4H$_2$O) mixture in a tubular oven under H$_2$ at 400° C., and subsequent reaction with NH$_3$ at 700° C. During this process, the (NH$_4$)$_6$Mo$_7$O$_{24}$ and Ni(NO$_3$)$_2$ precursors were reduced to NiMo metal particles by H$_2$, and then were mildly transformed to NiMoN$_x$ nanosheets by reaction with ammonia. The atomic ratio of Ni/Mo was 1/4.7 determined by EDX on the NiMoN$_x$/C sample.

The transmission electron microscopy (TEM) images, as shown in FIG. 1a, display that the NiMo particles are mainly sphere-shaped. The high-resolution TEM image, as shown in the inset of FIG. 1a, corroborated the presence of an amorphous 3-5 nm Ni/Mo oxide layer, while NiMoN$_x$ is characterized by thin, flat and flaky stacks composed of nanosheets with high radial-axial ratios (FIG. 1b). FIG. 1c shows that some of the nanosheets lay flat on the graphite carbon (as indicated by the black arrows), and some have folded edges that exhibit parallel lines corresponding to the different layers of NiMoN$_x$ sheets (white arrows). The thickness of the sheets ranged from 4 to 15 nm. The average stacking number of sheets measured from FIG. 1b is about six. It is noteworthy that a major part of the nanosheets was exfoliated and present in the form of single sheets. The HRTEM images in FIG. 1d show the morphology of these single sheets. The gap between two single sheets was found to be up to 2 nm.

Carbon-supported molybdenum nitride nanosheets (MoN/C) were also prepared by the same procedure as for NiMoN$_x$/C. HRTEM revealed the hexagonal lattices of the δ-MoN nanosheets in the <002> and <200> directions.

Figure 2:
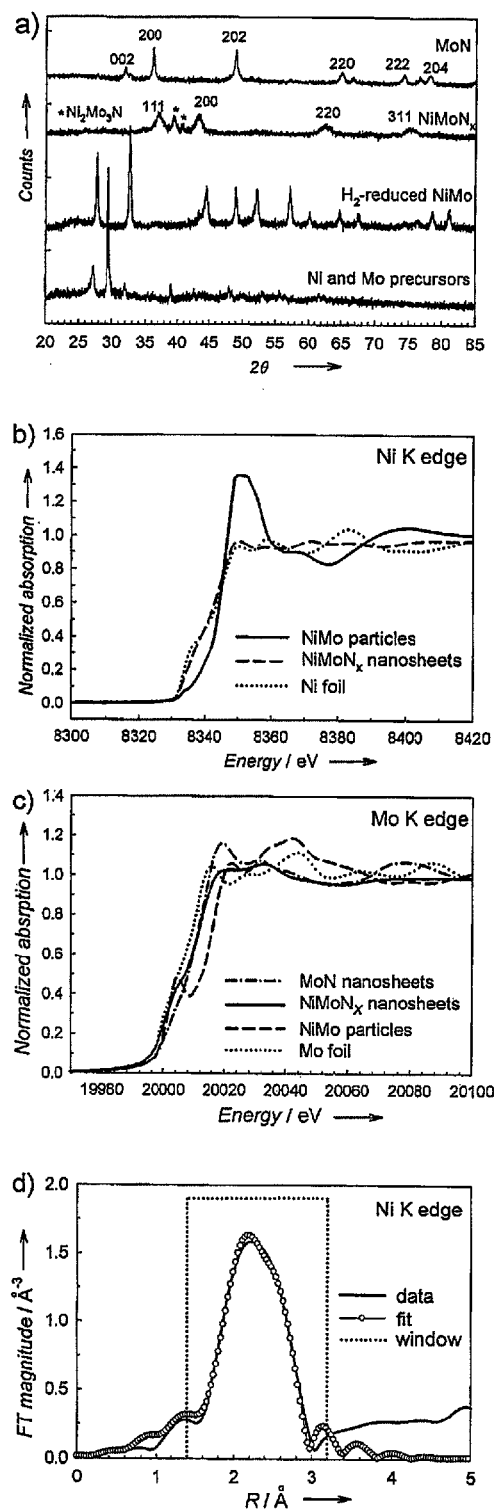
FIG. 2. a) XRD patterns of carbon-supported MoN, $NiMoN_x$, $H_2$-reduced NiMo, and NiMo precursors (labeled Ni and Mo precursors). XANES spectra of b) Ni K edge and c) Mo K edge from NiMo nanoparticles and $NiMoN_x$ nanosheets as well as Ni and Mo foils in b) and c) respectively. d) $K^2$-weighted EXAFS Fourier transform magnitudes and first-shell fit of Ni—K edge obtained from $NiMoN_x$.

Structural transformation from NiMo particles to NiMoN$_x$ sheets was demonstrated by XRD; the patterns of the mixture of Ni and Mo precursors, H$_2$-reduced NiMo/C and NiMoN$_x$/C are compared in FIG. 2a.

X-ray absorption was applied near-edge structure (XANES) and extended X-ray absorption fine structure (EXAFS) spectroscopies to probe charge states and local structure in NiMoN$_x$ and MoN nanosheets. The Ni K-edge XANES spectrum from NiMo particles in FIG. 2b shows a strong white line signal at 8350 eV which indicates that the NiMo alloy particles formed Ni oxides, in contrast to Ni atoms in NiMoN$_x$ that were in the metallic state. For the Mo K-edge (FIG. 2c), the pre-edge of the NiMo alloy at 20004 eV and the edge shifts compared to a Mo foil reflect holes in the d-band which can be ascribed to an increased oxidation state of the Mo atoms. In contrast, the white line at the Mo K-edge for NiMoN$_x$ exhibits a significant change compared to the NiMo alloy. It has been demonstrated by Chen (Chem. Rev. (1996) 96:1477-1498) that the density of states of the unfilled d-band of Mo can be modified as a metal-nitrogen bond is formed. Thus, the low Ni and Mo valence in NiMoN$_x$ can be reasonably ascribed to the deficiency in the d-band occupation of Mo near the Fermi level which causes the NiMoN$_x$ to possess an electron-donating ability, and to enhance its catalytic activity for reactions involving the donation of d-electrons, i.e., in the HER.

The EXAFS spectra at the Ni K edge of the NiMoN$_x$ are shown in FIG. 2d. The peak at 2.18 Å originates from three almost superimposed bands at 1.5 Å for the Ni—N bond, at 2.2 Å for the Ni—Ni, and at 2.5 Å for the Ni—Mo bond (all distances are uncorrected for the photoelectron phase shift). This peak is shifted to a higher r and broadened compared with that from a Ni foil. The differences between the nanosheets and their reference materials are apparent in the spectra, indicating that the atomic structures surrounding Ni and Mo in the NiMoN$_x$ nanosheets are significantly different from those in their bulk. The data at the Ni K edge from NiMoN$_x$ was fitted with models constructed from the Ni$_2$Mo$_3$N β-manganese structure as found in the literature (Wells, et al. (1999) J. Solid State Chem. 146:22-35). Good agreement was obtained between the fit and the experimental spectra (FIG. 2d). The Ni—Ni bond distance (R$_{Ni-Ni}$) in NiMoN$_x$ of 2.502±0.019 Å is slightly longer than those in bulk Ni (2.490 Å) and in Ni$_2$Mo$_3$N (2.468 Å). In contrast, the Ni—Mo bond distance (R$_{Ni-Mo}$) in NiMoN$_x$ of 2.748±0.026 Å is found to be shorter than that in the bulk NiMo alloy of 2.800 Å. The coordination numbers obtained from the fitting analysis show the notably higher value of 7.3±1.5 of Ni—Ni bonds compared to that in bulk Ni$_2$Mo$_3$N (N$_{Ni-Ni,bulk}$=3.0), while a lower number of Ni—Mo bonds was found (N$_{Ni-Mo}$= 4.7±1.5 vs 9.0 for bulk). This finding indicates that more Ni—Ni bonds are present in the Ni$_2$Mo$_3$N phase of NiMoN$_x$ nanosheets.

A theoretical study on a solute-host system predicted the segregation of nickel to the surface of NiMo alloys (Ruban et al., (1999) Phys Rev. B 59:15990-16000). Recently Eijsbouts et al. (J. Catal. (2005) 229:352-364) reported that Ni segregated from commercial NiMo/Al$_2$O$_3$ catalysts during ultra deep hydrodesulfurization (HDS) of diesel fuel. In the present NiMoN$_x$ system, the high N$_{Ni-Ni}$ and low N$_{Ni-Mo}$ demonstrated that Ni segregated to the surface of NiMoN$_x$ and formed a Ni-rich domain. This result corresponds well to the previous EXAFS studies on the NiMo system.

Bouwens et al. (Cat. Lett. (1990) 5:273-284) described the decoration of MoS$_2$ edge sites with Ni in the NiMoS system as due to segregation. Hamabe et al. (J. Synchrotron Rad. (2010) 17:530-539) found that the Ni—Ni coordination number obtained from the spent NiMoS HDS catalyst was approximately three times greater than the fresh catalyst due to segregation, and they observed destacked MoS$_2$-like slabs. Therefore, the particle-to-sheet transformation observed in NiMoN$_x$ is highly related to the segregation of the Ni phase during the nitriding process.

The HER activities of NiMoN$_x$/C and MoN/C in 0.1 M HClO$_4$ solution were investigated using a typical three-electrode setup. As a reference point, measurements using a commercial Pt catalyst (E-TEK 20 wt % Pt/XC-72) exhibiting high HER activity (with a near zero overpotential) were also performed.

Figure 3:
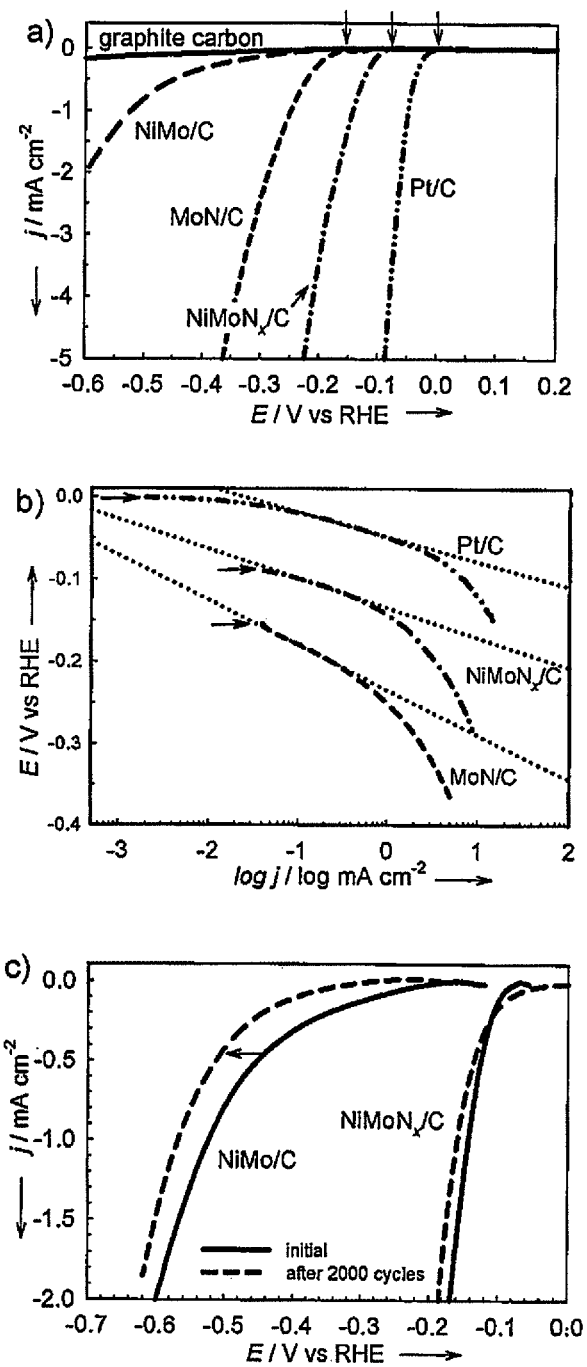
FIG. 3. a) The polarization curves of MoN/C, $NiMoN_x$/C, Pt/C catalysts and graphite carbon (XC-72) in 0.1M $HClO_4$ solution and b) corresponding Tafel plots of MoN/C, $NiMoN_x$/C, Pt/C catalysts and graphite carbon (XC-72) in 0.1M $HClO_4$ solution (scan rate 2 mVs$^{-1}$). c) The polarization curves of $NiMoN_x$/C and $H_2$-reduced NiMo/C before and after potential sweeps (−0.3~+0.9V) for 2,000 cycles in 0.1M $HClO_4$ solution.

In FIG. 3a, the polarization curve from MoN/C showed a small onset potential of −157 mV vs RHE for the HER, beyond which the cathodic current rose rapidly under more negative potentials. It was interesting to observe that the NiMoN$_x$/C catalyst showed an even more positive potential of −78 mV than MoN/C. In sharp contrast, the NiMo/C exhibited a further negative and indistinct potential for HER and a small current density. The overpotential for the HER on the NiMo alloy does not agree with that reported in the literature (−72 to −93 mV vs NHE) (Highfield, et al. (1999) Electrochim. Acta 44:2805-2814). The high overpotential of NiMo nanoparticles can partially be ascribed to the surface oxide layer formed upon exposure to air. Linear voltammetry in 0.1 M HClO$_4$ solution demonstrated that the NiMoN$_x$/C catalyst is fairly corrosion-resistant in the electrolyte; it showed a low current density up to a potential of +0.84 V vs RHE, indicating that the presence of nitrogen significantly stabilized NiMoN$_x$ nanosheets in an acidic medium. NiMo nanoparticles also showed a relatively low current density up to +0.6 V vs RHE; but this is presumably due to passivation by oxide layers, and eventually NiMo/C undergoes dissolution at higher potentials. The oxide formation on NiMo nanoparticles is also observed in the XANES analysis. Although the presence of oxide layers imparts the passivation in acid solutions, it may deteriorate the catalytic activity, resulting in the high overpotential.

The Tafel curves recorded on NiMoN$_x$/C, MoN/C and Pt/C (FIG. 3b) exhibited classical Tafel behavior, clearly indicating that the HER can be described using the Tafel equation. The curves in the low current density region, as presented in FIG. 3b, showed Tafel slopes of 30.1, 35.9, and 54.5 mV dec$^{-1}$ for Pt, NiMoN$_x$/C and MoN nanosheets, respectively. The Tafel curve of MoN clearly demonstrated that the HER occurs via a Volmer-Heyrovský mechanism, i.e., the slow step is the electrochemical desorption of H$_{ads}$ and H$_3$O$^+$ to form hydrogen. The HER onset potential and Tafel slope of bulk Mo metal are 0.23 V and 74 mV dec$^{-1}$. The comparatively lower onset potential and the smaller Tafel slope of MoN than those of bulk Mo demonstrate that the presence of nitrogen in the Mo lattice favors proton adsorption kinetics. This can be attributed to the reduced ability of nitrides to donate d-electrons as mentioned in the XANES section.

The onset potentials, Tafel slopes, and exchange current densities are listed in Table 1.

TABLE 1

Onset potential, Tafel slope and exchange current density of different catalysts.

| Catalyst | Onset potential[a] (mV vs RHE) | Tafel slope (mV dec$^{-1}$) | Exchange current density, j$_0$[b] (mA cm$^{-2}$) |
|---|---|---|---|
| MoN/C | −157 | 54.5 | 0.036 |
| NiMoN$_x$/C | −78 | 35.9 | 0.24 |
| Pt/C | 0 | 30.1 | 0.78 |

[a]The potential at which the hydrogen evolution occurred.
[b]determined from FIG. S3 in the Supporting Information.

For NiMoN$_x$, the low Tafel slope of 35.9 mV dec$^{-1}$ suggests that the recombination of two H$_{ads}$ is accelerated by the elimination of part of the excess energy, liberated in the union of the two hydrogen atoms, by the NiMoN$_x$ surface. The HER mechanism appears to change as Ni is incorporated. Here hydrogen evolution occurs via a Tafel-like mechanism. As previously mentioned in the EXAFS results, Ni segregates to the surface or edges of Ni$_2$Mo$_3$N phase. The Ni—Ni distance was found to increase, but the Ni—Mo distance shortened upon nitride formation. The increase in Ni—Ni distance causes the contraction of the Ni—Ni d-band, which would give a higher density of states near the Fermi level. On the other hand, the decrease in the Ni—Mo bond length downshifts the d-band center of the Mo atoms neighboring Ni relative to the Fermi level. The downshift of the d-band center has been correlated with the decrease of hydrogen binding energy (Ferrin et al. (2009) J. Phys. Chem. C 113:1411-1417) which leads to a relatively moderate Mo—H binding strength, and in turn helps recombination of two H$_{ads}$ atoms.

Recently, Navarro-Flores et al. (J. Mol. Cata. A (2005) 226:179-197) have proposed an electro-catalytic synergetic effect for enhanced hydrogen evolution kinetics on NiMo, NiW, and NiFe bimetallic alloys. Considering the exchange current density (j$_0$) of the NiMo alloy (20.5 µA cm$^{-2}$) presented by Navarro-Flores, the present NiMoN$_x$ exhibited a comparatively high j$_0$ of 0.24 mA cm$^{-2}$. This high j$_0$ is attributed to the unique exfoliated sheet nanostructure that affords highly accessible reactive sites, and to the enhanced reaction kinetics due to the d-band modification as discussed above.

To assess the long-term durability of the NiMoN$_x$, potential sweeps were conducted from −0.3 to +0.9 V for 2000 cycles. After cycling, the catalyst retained a very similar polarization curve to that before testing (FIG. 3c), indicating that the NiMoN$_x$ maintained its unique nanosheet structure over a long time in an acidic environment. The same experiment on the NiMo particles showed degradation of the activity. These results afforded evidence for the stabilizing effect of nitrides on the NiMo bimetallic structure.

EXPERIMENTAL

Material Synthesis:

Carbon-supported NiMo nitride (NiMoN$_x$/C) was prepared by ammonolysis of carbon-supported ammonium molybdate ((NH$_4$)$_6$Mo$_7$O$_{24}$.4H$_2$O, Aldrich) and nickel nitrate (Ni(NO$_3$)$_2$.4H$_2$O, Aldrich). Other metal nitrates may be used such as for example generally (M(NO$_3$)$_y$.XH$_2$O) where M can be Ni or other non-noble metals, y can be 2 or any subscript suitable for the metal nitrate, and X can be 4 or any suitable number for the metal nitrate. Ammonium molybdate and nickel nitrate were mixed with Vulcan XC-72R carbon black to obtain a loading of 20 wt % total metal. The mixture was dissolved in Millipore water, and 1 N NaOH was dripped into the solution so as to make the pH of the solution to be about 9. The solid mixture obtained was washed and rinsed with water and then dried at 80° C. The sample was then annealed at 400° C. under 15% H$_2$/Ar for 2 h in a tube furnace. Then the H$_2$-reduced sample was held in a quartz reactor into which a 100 ml min$^{-1}$ NH$_3$ (Matheson) was introduced. For nitriding, the temperature was increased from ambient to 700° C. at a rate of 7.5° C. min$^{-1}$ and then held at this temperature for 2 h. The reactor was cooled to ambient temperature in NH$_3$ flow, and then N$_2$ was purged through the reactor. Carbon-supported molybdenum nitride was prepared with the same procedure as above-mentioned, but using only ammonium molybdate as metal precursor.

Analytical Methods:

Electron microscopy, X-ray diffraction spectroscopy, synchrotron X-ray absorption spectroscopy, and electrochemical measurements were performed using methods standard in the art.

X-Ray Diffraction Spectroscopy.

XRD measurements were taken with a Rigaku Miniflex II diffractometer using Cu Kα radiation (λ=1.54056 Å). The patterns were collected from 20 to 85° at a scanning rate of 1° min$^{-1}$, with a step size of 0.01°. The lengths (D$_{hkl}$) of the NiMoN$_x$ sheets along the stacking and basal directions were calculated using the Debye-Scherrer equation, $$D_{hkl} = \frac{k_{hkl}\lambda}{\beta_{hkl}\cos(\theta)}$$

where λ is the wavelength of the X-rays (λ=1.54 Å) and β$_{hkl}$ (or FWHM) is the angular line width. The shape factor k$_{111}$ was equal to 0.76 and k$_{200}$ was 1.42. The average stacking number of the sheet was calculated using ñ=D$_{hkl}$/2.096, the value of 2.096 Å corresponding to the d-spacing of (200) plane in the γ-Mo$_2$N phase of NiMoN$_x$ sample.

Synchrotron X-Ray Absorption Spectroscopy.

The X-ray absorption spectroscopy (XAS) measurements were undertaken at the National Synchrotron Light Source (NSLS), BNL at the X19A and X18B beamlines. The measurements were carried out at the Mo K edge (20000 eV) and Ni K edge (8333 eV) at room temperature. The XAS data were acquired in both the transmission and fluorescence modes, although the data presented in this report were obtained in the former. The data acquired were processed and analyzed by Athena and Artemis software.

Electrochemical Measurements.

A thin film of the electrocatalyst was prepared on a glassy carbon rotating electrode (area: 0.196 cm$^2$) with a catalyst loading of 0.25 mg cm$^{-2}$ for electrochemical measurements. The electrode was then covered by a small amount of a Nafion solution (10 μL of 1% Nafion dispersion) and dried under vacuum before rotating disk electrode measurements. The presented current density refers to the geometric surface area of the glassy carbon electrode. Solutions were prepared from Optima perchloric acid obtained from Fisher and Milli-Q UV-plus water (Millipore). Commercial Pt/C (10 wt %) from E-TEK was used as received. An Ag/AgCl/KCl (3 M) electrode was used with a double-junction chamber as a reference, and all potentials, E, are quoted with respect to reversible hydrogen electrode (RHE). All electrochemical experiments are carried out at room temperature (25° C.).

Figure 4:
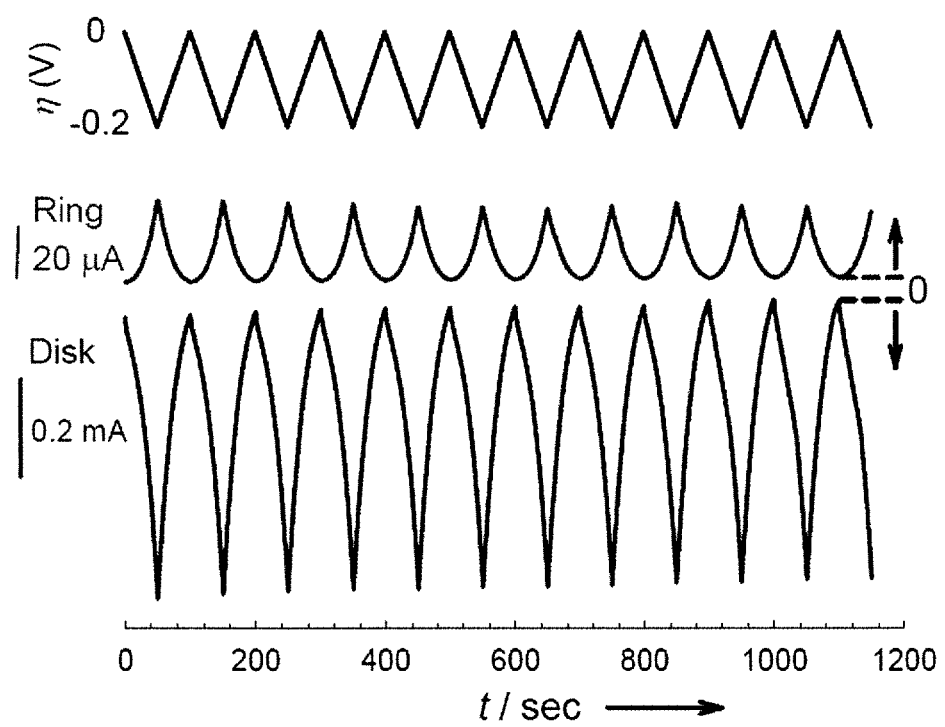
FIG. 4. Rotating ring-disk-electrode (glassy carbon disk with Pt ring) measurements of hydrogen evolution in a 0.1 M $HClO_4$ solution on NiMoNx. Top: disk overpotential (scan rate 5 mV s-1); middle: Pt ring current (Vring=+0.47 V vs RHE); bottom: disk current.

Rotating ring-disk electrode measurements were performed in which the disk was modified with NiMoN$_x$/C, and was treated by cycling the overpotential (η) between 0 and −0.2 V at a sweep rate of 5 mV s$^{-1}$ while the Pt ring was held at +0.47 V vs RHE. The rising anodic current on the Pt ring verified the hydrogen evolution on the disk (FIG. 4).

The polarization curves for hydrogen evolution reaction were described using the Tafel equation, η=a+b log j+jR$_s$, where η (V) denotes the applied overpotential, j (A cm$^{-2}$) the current density (refers to the geometric surface area of the glassy carbon electrode), b (V dec$^{-1}$) the Tafel slope, R$_s$ (Ωcm$^{-2}$) the total area-specific uncompensated resistance of the system.

Figure 5:
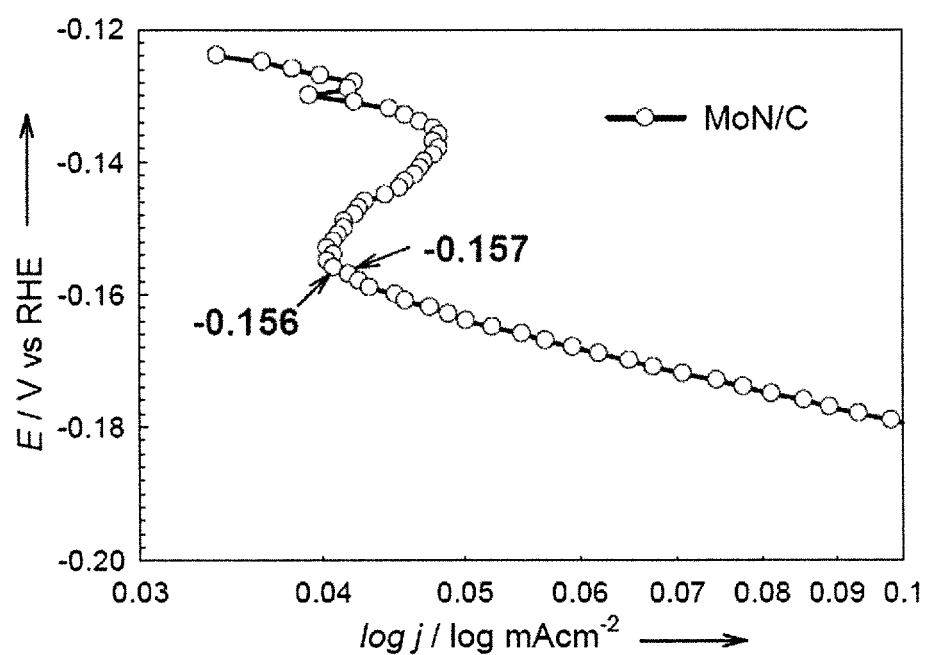
FIG. 5. The Tafel plot of MoN/C in the region of low current densities.

The onset-potential for HER was read from the semi-log (Tafel) plot. For example, the semi-log plot of MoN/C in the region of low current densities as displayed in FIG. 5 shows a linear relationship below −0.157 V but starts to deviate above −0.156 V. Therefore, −0.157 V was chosen as the onset potential for MoN/C. The same method was applied on determining the overpotential for other samples.

It is indistinct to find the exchange current density in the Tafel plot. The linear part of the polarization curve at small overpotentials (−5<η<+5 mV) in H$_2$-saturated 0.1 M HClO$_4$ solution was used to obtain j$_0$ values. The method has been described previously by Inoue et al., *J. Electroanal. Chem.* 2003, 554-555, 77-85.] The exchange current density can be calculated by $$j_0 = \frac{\Delta j}{\Delta \eta} \frac{RT}{nF}$$

Here n represents the number of electrons exchanged, F (96485 C mol$^{-1}$) is the Faraday constant, and R (8.314 J mol$^{-1}$K$^{-1}$) is the gas constant. In this way, exchange current densities of 0.78, 0.24, and 0.036 mA cm$^{-2}$ for Pt, NiMoN$_x$/C and MoN/C, respectively, were determined.

Comparison between the polarization curves collected with and without holding the NiMo/C catalyst at −0.5 V vs RHE for 30 min were made. The NiMo/C without pretreatment showed a slightly increasing cathodic current with potentials between −0.2 and −0.45 V, but a rapid increasing current as the potential went further negative. The pre-reduced NiMo/C showed a prominent onset potential for HER at −0.4 V and a higher HER current than the sample without pretreatment. Therefore, the small cathodic current observed at E=−0.2~−0.45 V was due to the reduction of oxide layer on NiMo nanoparticles. Since the oxide layer gave a considerable effect on the current, determination of Tafel slope and exchange current density by Tafel plot appeared impossible.

The overpotential for pre-reduced NiMo/C is higher than the data reported by Highfield, Electrochimica Acta 1999, 44, 2805. This is because the NiMo electrodes Highfield utilized were Ni-rich alloys (Ni/Mo ratio=4~24). The EDX analysis on the present NiMo/C nanoparticles showed that molybdenum was rich in the catalyst (Ni/Mo=1/4.7).

Some Preferred Embodiments

Metal-molybdenum nitride nanosheets comprising $M_aMo_bN_x$ wherein M is selected from the group consisting of Ni, Co, Cu, Fe, Ga, Ge, Mn, Cr, V, Ti, Zr, Sc, Y, Nb, Hf, Ta, La and Ce. M is selected from the group consisting of Ni, Co, Cu, Fe, Ga, Ge, Mn, Cr, V, Zr, Sc, Y and mixtures thereof. The metal-molybdenum nitride nanosheets comprise $M_aMo_bN_x$ wherein M is selected from the group consisting of Ni, Co, Cu, Fe, and mixtures thereof. The metal-molybdenum nitride nanosheets comprising $M_aMo_bN_x$, wherein the ratio of a:b is about 1:0.5 to 1:20. The metal-molybdenum nitride nanosheets comprising $M_aMo_bN_x$ wherein the ratio of a:b is about 1:1 to 1:20. The metal-molybdenum nitride nanosheets comprising $M_aMo_bN_x$ wherein the ratio of a:b is about 1:1 to 1:10. The metal-molybdenum nitride nanosheets comprising $M_aMo_bN_x$ wherein the ratio of a:b is about 1:1 to 1:5.

Metal-molybdenum carbide nanosheets comprising $M_aMo_bC_x$ wherein M is selected from the group consisting of Ni, Co, Cu, Fe, Ga, Ge, Mn, Cr, V, Ti, Zr, Sc, Y, Nb, Hf, Ta, La and Ce. The metal-molybdenum carbide nanosheets comprising $M_aMo_bC_x$ wherein M is selected from the group consisting of Ni, Co, Cu, Fe, Ga, Ge, Mn, Cr, V, Zr, Sc, Y and mixtures thereof. The metal-molybdenum carbide nanosheets comprising $M_aMo_bC_x$ wherein M is selected from the group consisting of Ni, Co, Cu, Fe, and mixtures thereof. The metal-molybdenum carbide nanosheets comprising $M_aMo_bC_x$, wherein the ratio of a:b is about 1:0.5 to 1:20. The metal-molybdenum carbide nanosheets comprising $M_aMo_bC_x$ wherein the ratio of a:b is about 1:1 to 1:20. The metal-molybdenum carbide nanosheets comprising $M_aMo_bC_x$ wherein the ratio of a:b is about 1:1 to 1:10. The metal-molybdenum carbide nanosheets comprising $M_aMo_bC_x$ wherein the ratio of a:b is about 1:1 to 1:5.

Metal-tungsten nitride nanosheets comprising $M_aW_bN_x$ wherein M is selected from the group consisting of Ni, Co, Cu, Fe, Ga, Ge, Mn, Cr, V, Ti, Zr, Sc, Y, Nb, Hf, Ta, La and Ce. Metal-tungsten nitride nanosheets comprising $M_aW_bN_x$ wherein M is selected from the group consisting of Ni, Co, Cu, Fe, Ga, Ge, Mn, Cr, V, Zr, Sc, Y and mixtures thereof. Metal-tungsten nitride nanosheets comprising $M_aW_bN_x$ wherein M is selected from the group consisting of Ni, Co, Cu, Fe, and mixtures thereof. Metal-tungsten nitride nanosheets comprising $M_aW_bN_x$, wherein the ratio of a:b is about 1:0.5 to 1:20. Metal-tungsten nitride nanosheets comprising $M_aW_bN_x$ wherein the ratio of a:b is about 1:1 to 1:20. Metal-tungsten nitride nanosheets comprising $M_aW_bN_x$ wherein the ratio of a:b is about 1:1 to 1:10. Metal-tungsten nitride nanosheets comprising $M_aW_bN_x$ wherein the ratio of a:b is about 1:1 to 1:5.

Carbon supported hydrogen evolution reaction catalysts comprising metal-molybdenum nitride nanosheets, metal-tungsten nitride nanosheets or metal-molybdenum carbide nanosheets wherein the metal is selected from the group consisting of Ni, Co, Cu, Fe, Ga, Ge, Mn, Cr, V, Ti, Zr, Sc, Y, Nb, Hf, Ta, La, Ce or mixtures thereof. The carbon supported catalysts wherein the carbon is in the form of activated carbon, carbon black, carbon nanotubes, carbon nanohorns, graphene, or reduced graphene oxide.

A method of making carbon-supported non-noble metal-molybdenum nitride nanosheets comprising reducing carbon-supported ammonium molybdate (($NH_4$)$_6$$Mo_7O_{24}$·$4H_2O$) and a non-noble metal nitrate ($M(NO_3)_y$·$XH_2O$) mixture in a tubular oven under $H_2$ at 400° C. and, reacting the reduced product with $NH_3$ at 700° C., thereby transforming the non-noble metal-molybdenum nitride particles to $MMoN_x$ nanosheets.

The method wherein the non-noble metal is selected from the group consisting of Ni, Co, Cu, Fe, Ga, Ge, Mn, Cr, V, Ti, Zr, Sc, Y, Nb, Hf, Ta, La, Ce or mixtures thereof. The method wherein the carbon support is selected from the group consisting of activated carbon, carbon black, carbon nanotubes, carbon nanohorns, graphene and reduced graphene oxides.

The invention claimed is:

1. Metal-molybdenum nitride nanosheets comprising $M_aMo_bN_x$ wherein M is selected from the group consisting of Ni, Co, Cu, Fe, Ga, Ge, Mn, Cr, V, Ti, Zr, Sc, Y, Nb, Hf, Ta, La and Ce and mixtures thereof.

2. The metal-molybdenum nitride nanosheets, $M_aMo_bN_x$ of claim 1 wherein M is selected from the group consisting of Ni, Co, Cu, Fe, Ga, Ge, Mn, Cr, V, Zr, Sc, Y and mixtures thereof.

3. The metal-molybdenum nitride nanosheets comprising $M_aMo_bN_x$ of claim 2 wherein M is selected from the group consisting of Ni, Co, Cu, Fe, and mixtures thereof.

4. The metal-molybdenum nitride nanosheets comprising $M_aMo_bN_x$ of claim 1 wherein the ratio of a:b is about 1:0.5 to 1:20.

5. The metal-molybdenum nitride nanosheets comprising $M_aMo_bN_x$ of claim 4 wherein the ratio of a:b is about 1:1 to 1:20.

6. The metal-molybdenum nitride nanosheets comprising $M_aMo_bN_x$ of claim 5 wherein the ratio of a:b is about 1:1 to 1:10.

7. The metal-molybdenum nitride nanosheets comprising $M_aMo_bN_x$ of claim 6 wherein the ratio of a:b is about 1:1 to 1:5.

8. Carbon supported hydrogen evolution reaction catalysts comprising metal-molybdenum nitride nanosheets, wherein the metal is selected from the group consisting of Ni, Co, Cu, Fe, Ga, Ge, Mn, Cr, V, Ti, Zr, Sc, Y, Nb, Hf, Ta, La, Ce and mixtures thereof.

9. The carbon supported catalysts of claim 8 wherein the carbon is in the form of activated carbon, carbon black, carbon nanotubes, carbon nanohorns, graphene, or reduced graphene oxide.

10. A method of making carbon-supported non-noble metal-molybdenum nitride nanosheets comprising reducing carbon-supported ammonium molybdate (($NH_4$)$_6$$Mo_7O_{24}$·$4H_2O$) and a non-noble metal nitrate ($M(NO_3)_y$·$XH_2O$) mixture in a tubular oven under $H_2$ at 400° C.: and, reacting the reduced product with $NH_3$ at 700° C., thereby transforming the non-noble metal-molybdenum nitride particles to $MMoN_x$ nanosheets, wherein the non-noble metal is selected from the group consisting of Ni, Co, Cu, Fe, Ga, Ge, Mn, Cr, V, Ti, Zr, Sc, Y, Nb, Hf, Ta, La, Ce and mixtures thereof.

11. The method according to claim 10 wherein the carbon support is selected from the group consisting of activated carbon, carbon black, carbon nanotubes, carbon nanohorns, graphene and reduced graphene oxides.

* * * * *

UNITED STATES PATENT AND TRADEMARK OFFICE
CERTIFICATE OF CORRECTION

PATENT NO.         : 8,927,453 B2                               Page 1 of 1
APPLICATION NO.    : 13/868030
DATED              : January 6, 2015
INVENTOR(S)        : Sasaki et al.

It is certified that error appears in the above-identified patent and that said Letters Patent is hereby corrected as shown below:

TITLE PAGE:

Now reads:    "(12) United States Patent
                           Kotaro et al."

Should read:   -- (12) United States Patent
                           Sasaki et al. --

Now reads:    "(72) Inventors:    Sasaki Kotaro, Hauppauge, NY (US);
                                                 Wei-Fu Chen, Ridge, NY (US);
                                                 James T. Muckerman, Port Jefferson, NY (US);
                                                 Radoslav R. Adzic, East Setauket, NY (US)"

Should read:   -- (72) Inventors:    Kotaro Sasaki, Hauppauge, NY (US);
                                                 Wei-Fu Chen, Ridge, NY (US);
                                               James T. Muckerman, Port Jefferson, NY (US);
                                               Radoslav R. Adzic, East Setauket, NY (US) --

Signed and Sealed this
Seventh Day of June, 2016

Michelle K. Lee
*Director of the United States Patent and Trademark Office*